United States Patent
Mouhouche et al.

(10) Patent No.: US 9,628,589 B2
(45) Date of Patent: Apr. 18, 2017

(54) ADDITIONAL CHANNELS USING PREAMBLE SYMBOLS

(71) Applicant: SAMSUNG ELECTRONICS CO., LTD., Suwon-si (KR)

(72) Inventors: Belkacem Mouhouche, Staines (GB); Daniel Ansorregui Lobete, Staines (GB); Young-ho Oh, Suwon-si (KR); Hak-ju Lee, Seoul (KR); Javier Morgade Prieto, Bayern (DE)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 14/814,813

(22) Filed: Jul. 31, 2015

(65) Prior Publication Data

US 2016/0119919 A1 Apr. 28, 2016

(30) Foreign Application Priority Data

Oct. 27, 2014 (GB) .................................. 1419081.3
Jan. 16, 2015 (KR) ........................ 10-2015-0008032

(51) Int. Cl.
*H04L 29/06* (2006.01)
*H04N 19/89* (2014.01)
*H04W 72/04* (2009.01)

(52) U.S. Cl.
CPC .............. *H04L 69/22* (2013.01); *H04N 19/89* (2014.11); *H04W 72/0446* (2013.01)

(58) Field of Classification Search
None
See application file for complete search history.

(56) References Cited

U.S. PATENT DOCUMENTS

| | | | |
|---|---|---|---|
| 8,649,450 B2 * | 2/2014 | Hou-Shin | H04L 5/0053 375/260 |
| 8,670,494 B2 | 3/2014 | Ko et al. | |
| 9,264,272 B2 * | 2/2016 | Stadelmeier | H04L 27/2602 |
| 9,438,373 B2 * | 9/2016 | Hong | H04H 20/42 |
| 9,450,799 B2 * | 9/2016 | Ko | H04L 1/0045 |
| 2012/0243561 A1 | 9/2012 | Loghin et al. | |
| 2013/0051372 A1 * | 2/2013 | Gutierrez | H04L 1/008 370/336 |
| 2013/0242847 A1 | 9/2013 | Oh et al. | |

(Continued)

OTHER PUBLICATIONS

Search Report dated Jul. 21, 2015, issued by the International Searching Authority in counterpart International Application No. PCT/KR2015/002768.

(Continued)

*Primary Examiner* — Hong Cho
(74) *Attorney, Agent, or Firm* — Sughrue Mion, PLLC

(57) ABSTRACT

A method for transmitting information is provided. The method for transmitting information comprises the steps of: mapping signalling information to one or more preamble symbols of a first frame, mapping data to one or more data symbols of the first frame, dividing additional information into two or more parts, mapping a first part of the additional information to one or more preamble symbols of the first frame, mapping a second part of the additional information to at least one of (i) one or more data symbols of the first frame, and (ii) one or more preamble symbols of a second frame and transmitting the frames.

20 Claims, 15 Drawing Sheets

(56) References Cited

U.S. PATENT DOCUMENTS

2013/0272448 A1 10/2013 Moon et al.
2014/0120861 A1 5/2014 Kwak et al.
2014/0143639 A1 5/2014 Loghin et al.
2014/0314177 A1 10/2014 Choi et al.

OTHER PUBLICATIONS

Written Opinion dated Jul. 21, 2015, issued by the International Searching Authority in counterpart International Application No. PCT/KR2015/002768.

* cited by examiner

FIG. 9
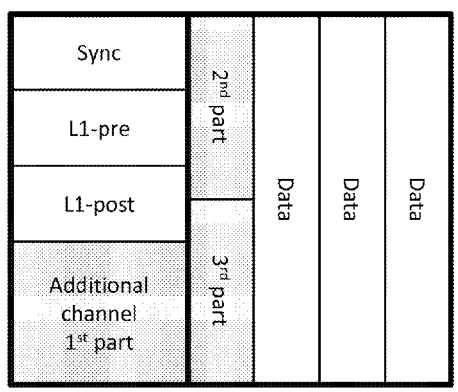
Frame 1
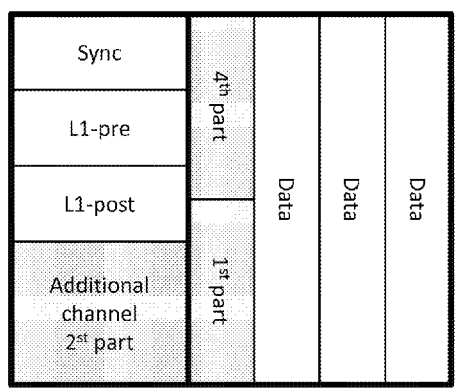
Frame 2
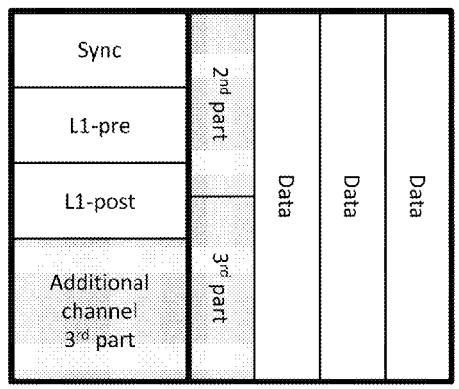
Frame 3
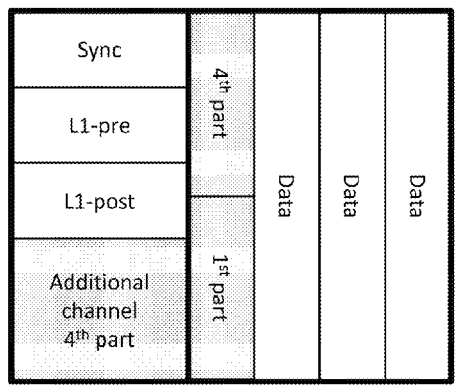
Frame 4

US 9,628,589 B2

ADDITIONAL CHANNELS USING PREAMBLE SYMBOLS

CROSS-REFERENCE TO RELATED APPLICATION

This application claims priority under 35 U.S.C. §119 (a) from UK Patent Application No. GB1419081.3, filed on Oct. 27, 2014, in the UK Intellectual Property Office and Korean Patent Application No. 10-2015-0008032, filed on Jan. 16, 2015 in the Korean Intellectual Property Office, the disclosure of which is incorporated herein by reference in its entirety.

BACKGROUND

1. Field

The present invention relates generally to methods, apparatus and systems for transmitting and receiving data. For example, certain embodiments of the present invention provide methods, apparatus and systems for providing one or more additional channels in a frame structure comprising a preamble portion and a data portion. Certain embodiments of the present invention may be applied in existing and future generation digital broadcasting systems, for example systems developed by the Digital Video Broadcasting (DVB) Project and/or the Advanced Television Systems Committee (ATSC).

2. Description of the Related Art

Digital broadcasting techniques allow various types of digital content, for example video and audio data, to be distributed to end users. A number of standards have been developed for this purpose, including a family of standards developed by the ATSC organization, including standards ATSC 1.0 and ATSC 2.0. The ATSC Digital Television (DTV) Standard, described in various documents, including A/52 and A/53, available at http://www.atsc.org/, have been adopted for use in terrestrial broadcasting by various countries, including the United States, Canada and South Korea.

Recently, ATSC has begun developing a new standard, known as ATSC 3.0, for a delivery method of real-time and non-real-time television content and data to fixed and mobile devices. As part of this development, ATSC has published a Call for Proposals (CFP) document (TG3-S2 Doc. #023r20, "Call for Proposals For ATSC-3.0 PHYSICAL LAYER, A Terrestrial Broadcast Standard", ATSC Technology Group 3 (ATSC 3.0), 26 Mar. 2013), in which a stated goal is to identify technologies that could be combined to create a new physical layer of an ATSC 3.0 Standard. It is envisaged that the ATSC 3.0 system will be designed with a layered architecture and a generalized layering model for ATSC 3.0 has been proposed. The scope of the aforementioned CFP is limited to the base layer of this model, the ATSC 3.0 Physical Layer, which corresponds to Layer 1 and 2 of the ISO/IEC 7498-1 model.

It is intended that ATSC 3.0 will not require backward compatibility with existing broadcasting systems, including ATSC 1.0 and ATSC 2.0. However, the CFP states that, wherever practicable, the standard shall utilize and reference existing standards that are found to be effective solutions to meet the requirements.

Other existing standards developed for broadcasting digital content include a family of open standards developed and maintained by the Digital Video Broadcasting (DVB) Project and published by the European Telecommunications Standards Institute (ETSI). One such standard is DVB-T2, which is described in various documents, including ETSI EN 302 755 V1.3.1, ("Digital Video Broadcasting (DVB); Frame structure channel coding and modulation for a second generation digital terrestrial television broadcasting system (DVB-T2)"), and Technical Specification ETSI TS 102 831 V1.2.1 ("Digital Video Broadcasting (DVB); Implementation guidelines for a second generation digital terrestrial television broadcasting system (DVB-T2)").

In DVB-T2, data is transmitted in a frame structure, which will now be briefly described with reference to FIG. 1. At the top level, the frame structure 100 consists of super-frames 101a-c, which are divided into a number of T2-frames 103a-d. Each T2-frame 103a-d is sub-divided into OFDM symbols, including a number of preamble symbols 105, 107a-c followed by a number of data symbols 109a-e. In a T2-frame 103a-d, the preamble symbols 105, 107a-c comprise a single P1 preamble symbol 105, followed by one or more P2 preamble symbols 107a-c.

The P1 symbol 105, located at the beginning of a T2 frame 103a-d, carries 7 bits for signalling, including S1 signalling used to identify the format of the P2 symbols 107a-c and S2 signalling used to signal certain basic transmission parameters. The P2 symbols 107a-c, immediately following the P1 symbol 105, are used for fine frequency and timing synchronisation and channel estimation. The P2 symbols 107a-c carry L1 signalling information, and may also carry data. The L1 signalling is divided into L1-pre signalling and L1-post signalling. The L1-pre signalling includes basic information about the T2 frame structure 100, and enables the reception and decoding of the L1-post signalling. The L1-post signalling provides sufficient information for the receiver to decode Physical Layer Pipes (PLPs) within the T2-frames, which carry data.

Service data (e.g. in the form of one or more MPEG-2 Transport Streams) may be separated into one or more data streams, which are then carried in the form of PLPs. Each PLP is a logical channel, which may carry one or multiple services.

The procedure by which information is mapped to symbols of a T2-frame 103a-d will now be briefly described.

In the following, a modulation value for one OFDM carrier during one OFDM symbol (e.g. a single constellation point) may be referred to as an OFDM cell. An OFDM cell corresponding to data (e.g. PLP data) may be referred to as a data cell and an OFDM cell corresponding to signalling may be referred to as a signalling cell. An OFDM cell corresponding to L1 signalling (including L1-pre and L1-post) may be referred to as an L1 signalling cell.

The carriers of the OFDM symbols forming a T2-frame 103a-d may be pictured as forming a grid of cells 200, as illustrated in FIG. 2. Cells of the grid 200 corresponding to different carriers of the same OFDM symbol may be arranged in the same column (e.g. with cells corresponding to carriers of increasing frequency being arranged from top to bottom), while cells of the grid 200 corresponding to carriers having the same carrier frequency of different OFDM symbols may be arranged in rows (e.g. with cells corresponding to OFDM symbols in order of time being arranged from left to right).

Information (including signalling and data) is mapped to symbols of the T2-frame 103a-d. This process may be pictured as mapping OFDM cells, including signalling cells and data cells, to cells of a grid 200 of the form described above.

For example, S1 and S2 signalling bits are mapped to cells of the P1 symbol 205. Next, L1 signalling cells are mapped to cells of the P2 symbols 207a-c in a row-wise zig-zag manner, such that L1 signalling cells are mapped to fill a row of the P2 symbols 207a-c before proceeding to the next row. After L1 signalling cells have been mapped to cells of the P2 symbols 207a-c, the remaining active cells of the P2 symbols 207a-c (e.g. excluding cells used for pilot signals), and the following data symbols 209a-e, are available for carrying PLP data in a non zig-zag manner.

In digital broadcasting systems, in order to recognize and properly decode a received signal it is necessary to first perform synchronisation. Synchronization allows the receiver to identify the presence of a frame in the received signal and to identify the beginning of the frame. In addition, the values of one or more system parameters typically need to be signalled by the transmitter to the receiver to assist the receiver in decoding the signal. Detection, synchronization and signalling information is typically provided in a preamble portion of a received signal. For example, in DVB-T2, synchronization and signalling is achieved using the P1 and P2 symbols 105, 107a-c.

What is desired is a technique for transmitting and receiving additional data within an existing or future frame structure. For example, what is desired is a technique for providing one or more additional data channels in a frame structure in existing and future generation digital broadcasting systems, for example systems developed by the Digital Video Broadcasting (DVB) Project and/or the Advanced Television Systems Committee (ATSC) (e.g. the ATSC 3.0 Standard).

SUMMARY

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

The present invention is defined in the independent claims. Advantageous features are defined in the dependent claims.

Other aspects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

The above and other aspects, and features and advantages of certain exemplary embodiments and aspects of the present invention will be more apparent from the following detailed description when taken in conjunction with the accompanying drawings, in which:

FIGS. 3-10 illustrate the mapping of different types of information to cells of a frame structure according to various exemplary embodiments of the present invention;

DETAILED DESCRIPTIONS OF THE EXEMPLARY EMBODIMENTS

Figure 1:
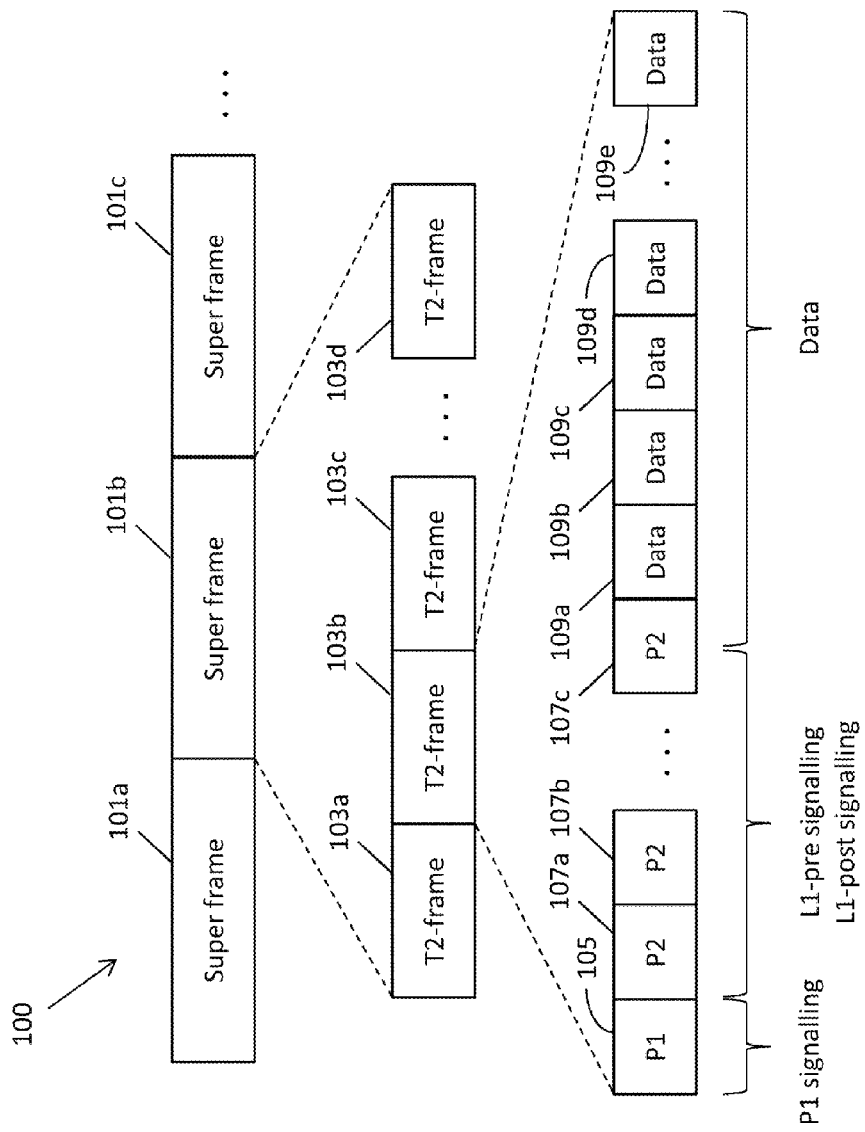
FIG. 1 illustrates the frame structure used in DVB-T2.
Figure 2:
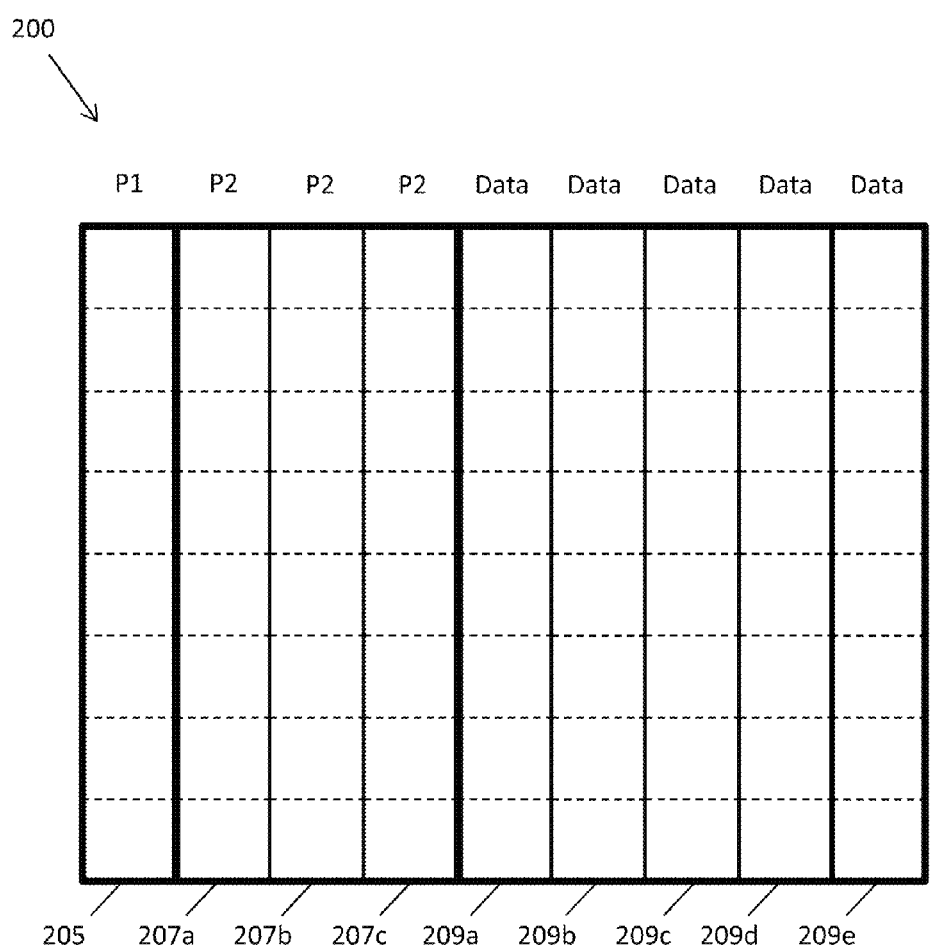
FIG. 2 illustrates a grid of cells comprising the carriers of OFDM symbols forming a T2-frame.

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Certain embodiments of the present invention provide methods, apparatus and systems for transmitting and receiving data. In certain embodiments the data is transmitted and received in a frame structure or data structure suitable for a digital broadcasting system. For example, in certain embodiments, the frame structure may be used in one or more existing and/or future generation digital broadcasting systems, for example systems developed by the Digital Video Broadcasting (DVB) Project and/or the Advanced Television Systems Committee (ATSC) (e.g. the ATSC 3.0 Standard). The skilled person will appreciate that the present invention is not limited to use in connection with any particular system or standard, and that various embodiments provide a technique for transmitting and receiving data in any suitable type of digital broadcasting system.

Embodiments of the present invention may be implemented in the form of any suitable method, system and/or apparatus for use in digital broadcasting. For example, certain embodiments may be implemented in the form of a mobile/portable terminal (e.g. mobile telephone), hand-held device, personal computer, digital television and/or digital radio broadcast transmitter and/or receiver apparatus, set-top-box, etc. Any such method, system and/or apparatus may be compatible with any suitable existing or future digital broadcast system and/or standard, for example one or more of the digital broadcasting systems and/or standards referred to herein.

Certain embodiments may be implemented in the form of a system comprising a transmitter side apparatus and a receiver side apparatus. The transmitter side apparatus may be configured to generate one or more frames and transmit, to the receiver side apparatus, a signal corresponding to the frames. The receiver side apparatus may be configured to receive the signal, extract information contained in the frames, and perform any further decoding and/or processing operations. Certain embodiments may comprise a transmitter side apparatus only, a receiver side apparatus only, or a system comprising both a transmitter side apparatus and a receiver side apparatus.

A frame disclosed herein may be generated and transmitted using any suitable method comprising steps for generating and transmitting such a frame, or using any suitably arranged apparatus and/or system comprising means for generating and transmitting such a frame. A frame disclosed herein may be received, and information contained therein may be extracted, using any suitable method comprising steps for receiving such a frame and extracting information contained therein, or using any suitably arranged apparatus and/or system comprising means for receiving such a frame and extracting information contained therein. The methods described herein may be implemented in any suitably arranged apparatus and/or system comprising means for carrying out the method steps.

A frame structure according to exemplary embodiments of the present invention comprises a preamble portion (or zone) and a data portion (or zone). The frame structure may comprise one or more other portions (or zones). Embodiments of the present invention are not limited to any particular ordering of the various portions, although the preamble portion typically precedes the data portion. In some embodiments, the preamble portion may be the first portion of the frame structure. However, in other embodiments, one or more portions may precede the preamble portion. For example, the frame structure may comprise a guard interval (or zone) preceding the preamble portion.

In the embodiments described below, the preamble portion is used to carry a synchronisation sequence and signalling. However, the skilled person will appreciate that the preamble portion may be used to carry any suitable type of information.

Furthermore, in the embodiments described below, the preamble portion and data portion of a frame each comprise one or more symbols. However, the skilled person will appreciate that the preamble portion and the data portion of a frame may comprise any other suitable type of information-carrying entity. The term "cell" may be used herein to refer to a certain unit of information (e.g. a basic information unit), for example an OFDM cell. A "symbol", for example an OFDM symbol, may comprise one or more cells.

As described above, a frame structure may comprise one or more preamble symbols for carrying signalling and one or more data symbols for carrying data. Each symbol may comprise one or more cells. In the following examples, the preamble symbols comprise P2 type symbols for carrying L1-pre and L1-post type signalling, and the data symbols are used to carry data in the form of PLP type channels. For example, the P2 symbols may be 8K Orthogonal Frequency Division Multiplexing (OFDM) symbols, and may be coded using a 16K Low Density Parity Check (LDPC) code. The data symbols may be, for example, 32K OFDM symbols, and may be coded using a 64K LDPC code. However, the skilled person will appreciate that the present invention is not limited to these specific examples. For example, the present invention is not limited to P2 symbols carrying L1-pre and L1-post signalling, or data symbols carrying data in the form of PLPs. Also, the present invention is not limited to OFDM symbols. For example, the symbols may comprise any suitable type of multi-carrier (or multi-cell) symbols and/or single-carrier (or single-cell) symbols.

In certain scenarios, the use of the entire capacity of the preamble symbols (e.g. the P2 symbols) for carrying signalling (e.g. L1-pre and L1-post signalling) is not always required. For example, limiting the lowest effective coding rate, for example to be 0.3, may create or increase spare capacity in the preamble symbols. Furthermore, the use of certain modulation schemes (e.g. Non-Uniform Quadrature Amplitude Modulation, NUQAM) may create or increase additional capacity for additional channels. In these cases, the spare capacity (i.e. remaining cells, or unused cells) of the P2 symbols may be used to carry additional data. For example, the spare capacity may be used to carry one or more additional channels (e.g. common channels).

Additional channels carried using the P2 symbols may contain information addressed to multiple users, for example all users (typically not the case for data carried in PLPs). The presence of any additional channels may be signalled, for example in the L1-pre or L1-post signalling carried by the P2 symbols. The additional channels carried using the P2 symbols may use the same or different modulation and coding schemes as the signalling carried by the P2 symbols.

Examples of additional channels include a Fast Information Channel (FIC) and an Emergency Alert Channel (EAC). The FIC is a dedicated channel for carrying cross-layer information to enable fast service acquisition and channel scanning. Examples of information carried by the FIC include (i) channel binding information between PLPs, (ii) broadcaster's ID and number of services, and (iii) services of each broadcaster. The EAC is used to carry emergency messages or links to the PLPs carrying emergency messages.

In one specific example, 6868 P2 cells are available and 2128 cells are used for L1-pre signalling. By fixing the L1-post effective coding rate (e.g. to ⅓) then the number of cells used for L1-post signalling is given by:

$$\text{Cell\_Post}=((K_{sig\_L1post}+168)*3.33)/N_{mod\_L1post}$$

This equation gives the number of cells that are needed in certain embodiments to transmit L1-post signalling. $K_{sig\_L1post}$ denotes the number of bits of L1-post before encoding. $N_{mod\_L1post}$ denotes the constellation size (or order) used for the L1-post. For example $N_{mod\_L1post}=1$ for BPSK or 2-QPSK, $N_{mod\_L1post}=4$ for 16-QAM, etc. The value 168 is a postfix added to L1-post.

In this case, the number of remaining cells (6868-2128-Cell_Post) can be used for additional channels. For example, in the case of Ksig_L1post=2000 and Nmod_L1post=4, then 1805 cells are used for L1-post signalling and the remaining 2935 cells may be used for additional channels.

In some cases, the spare capacity in the P2 symbols of a single frame may not be sufficient to carry a desired amount of additional data. For example, in the above example, the data to be transmitted may be greater than the capacity of the available 2931 unused cells. Embodiments of the present invention address this problem.

Embodiments of the present invention may be applied to receivers operating in various modes. For example, when operating in a full operational mode, a receiver is active to receive both P2 symbols and data symbols. When operating in P2 monitoring mode, the receiver is active to receive the P2 symbols but one or more components are powered down such that the data symbols are not received, to achieve power saving. The skilled person will appreciate that the present invention is not limited to these specific modes.

Certain exemplary embodiments may adjust one or more transmission parameters (e.g. coding rate and modulation scheme) of the P2 symbols to allow both signalling and the additional channels to be carried in the P2 symbols. For example, the transmission parameters may be modified for both the signalling information (e.g. L1-post signalling) and the additional channels.

In certain embodiments, it may be preferable to maintain a certain level of performance (e.g. Bit Error Rate (BER) or Signal-to-Noise Ratio (SNR)) with respect to the signalling information. Accordingly, the transmission parameters used for the cells for the signalling information may be selected so as to achieve a required level of performance (e.g. by using a relatively low puncturing rate and/or by using a relatively low modulation order). The transmission parameters used for the cells for the additional channels may then be selected to ensure that a certain amount of data may be carried in the spare capacity of the P2 symbols.

In certain embodiments, to achieve maximum possible performance with respect to the additional channels, once the transmission parameters for the cells for the signalling information have been selected, the optimal possible transmission parameters with respect to performance (e.g. a minimal possible puncturing rate and/or a minimal possible modulation order) may be selected for the additional channels, while being constrained by the requirement that the additional channels fit in the spare capacity.

Figure 3:
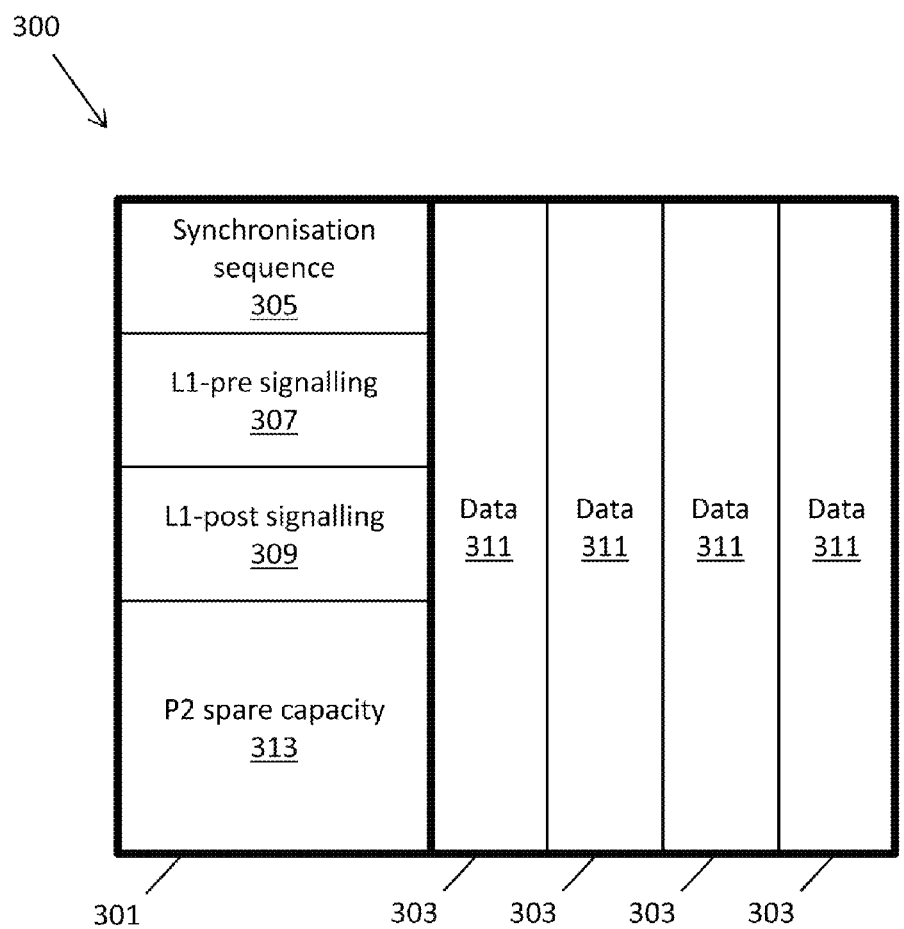

FIG. 3 illustrates a mapping of different types of information to cells of a frame structure according to an exemplary embodiment. As illustrated in FIG. 3, each frame 300 comprises one or more P2 symbols 301 and one or more data symbols 303. Each symbol comprises one or more cells (not shown). A synchronisation sequence 305, L1-pre signalling 307 and L1-post signalling 309 are mapped to the P2 symbols 301 (i.e. mapped to cells of the P2 symbols 301), and data 311 are mapped to the data symbols 303 (i.e. mapped to cells of the data symbols 303). The P2 symbols 301 also comprise a certain amount of spare capacity 313 (i.e. unused cells), which may be used for one or more addition channels.

The L1-post signalling is mapped to the P2 symbols before mapping of the additional channels. If, after mapping the synchronisation sequence, L1-pre signalling and L1-post signalling, there is insufficient capacity in the P2 symbols for carrying the additional channels, then one or more transmission parameters for the L1-post signalling may be modified to increase the effective available capacity. For example, the transmission parameters may be modified such that, if possible, there is sufficient available capacity in the P2 symbols of a single frame for carrying the additional channels. For example, the puncturing rate and modulation order may be increased. The transmission parameters may be modified while being constrained by the requirements that the performance of the L1-post signalling is sufficiently high (e.g. above a certain threshold), and that at least a certain minimum level of performance (e.g. Quality of Service (QoS)) for the additional channels can be maintained.

The length of the L1-post signalling may be indicated in the signalling part of the frame (e.g. in the L1-pre signalling). The values of the transmission parameters (e.g. puncturing rate and modulation order) and the length of the additional channels may also be indicated in the signalling part of the frame (e.g. in the L1-pre signalling). In some cases, some values may be deducible from other values. For example, one of the three parameters (i) length of the additional channels, (ii) puncturing rate, and (iii) modulation order may be deduced from the other two. In this case, a set of values allowing all values to be deduced may be signalled.

In this embodiment, since all information carried by the additional channels is contained within the P2 symbols of a single frame, the additional channels may be received by receivers operating in both full operational mode and P2 monitoring mode. Furthermore, the information carried by the additional channels may be received within one frame.

By selecting suitable transmission parameters for the L1-post signalling 309, a certain level of performance is maintained for the L1-post signalling. Furthermore, the transmission parameters used for the additional channels are selected such that the information carried by the additional channels fits within the available spare capacity 313 of a single frame 300, and such that at least a certain minimum level of performance for the additional channels can be maintained.

FIGS. 4-10 illustrate mappings of different types of information to cells of a frame structure according to various exemplary embodiments. Similar to the example illustrated in FIG. 3, in each of the examples illustrated in FIGS. 4-10, each frame comprises one or more P2 symbols and one or more data symbols. A synchronisation sequence, L1-pre signalling and L1-post signalling are mapped to the P2 symbols, and data are mapped to the data symbols. The P2 symbols also comprise a certain amount of spare capacity, which may be used for one or more addition channels.

In the embodiments illustrated in FIGS. 4-10, the information carried by the additional channels is divided into two or more parts. A first part of the information is mapped to the spare capacity of the P2 symbols of a first frame and the remaining parts are mapped to one or both of (i) the spare capacity of the P2 symbols of one or more subsequent frames, and (ii) data symbols of the first frame and/or one or more subsequent frames. In these embodiments, since it is not necessary for the information carried by the additional channels to fit within the spare capacity of the P2 symbols of a single frame, one or more transmission parameters may be selected for the additional channels to achieve at least a certain level of performance. For example, the puncturing rate and modulation order may be selected to be higher than certain respective values. The skilled person will appreciate that the present invention is not limited to the specific examples illustrated in FIGS. 4-10.

In some embodiments, the various parts of the information carried by the additional channels may all be the same size. However, in other embodiments, at least some of the parts may be different sizes.

In the following description, different parts of the information carried by the additional channels may be labelled as "first part", "second part" etc. to distinguish between them. However, the skilled person will appreciate that the different parts may occur in any suitable order in the original information. For example, a "first part" may occur before or after a "second part" in the original information. Furthermore, in the following description, different frames may be labelled as "first frame", "second frame" etc. to distinguish between them. However, the skilled person will appreciate that the different frames may occur in any suitable order. For example, a "first frame" may occur before or after a "second frame".

Figure 4:
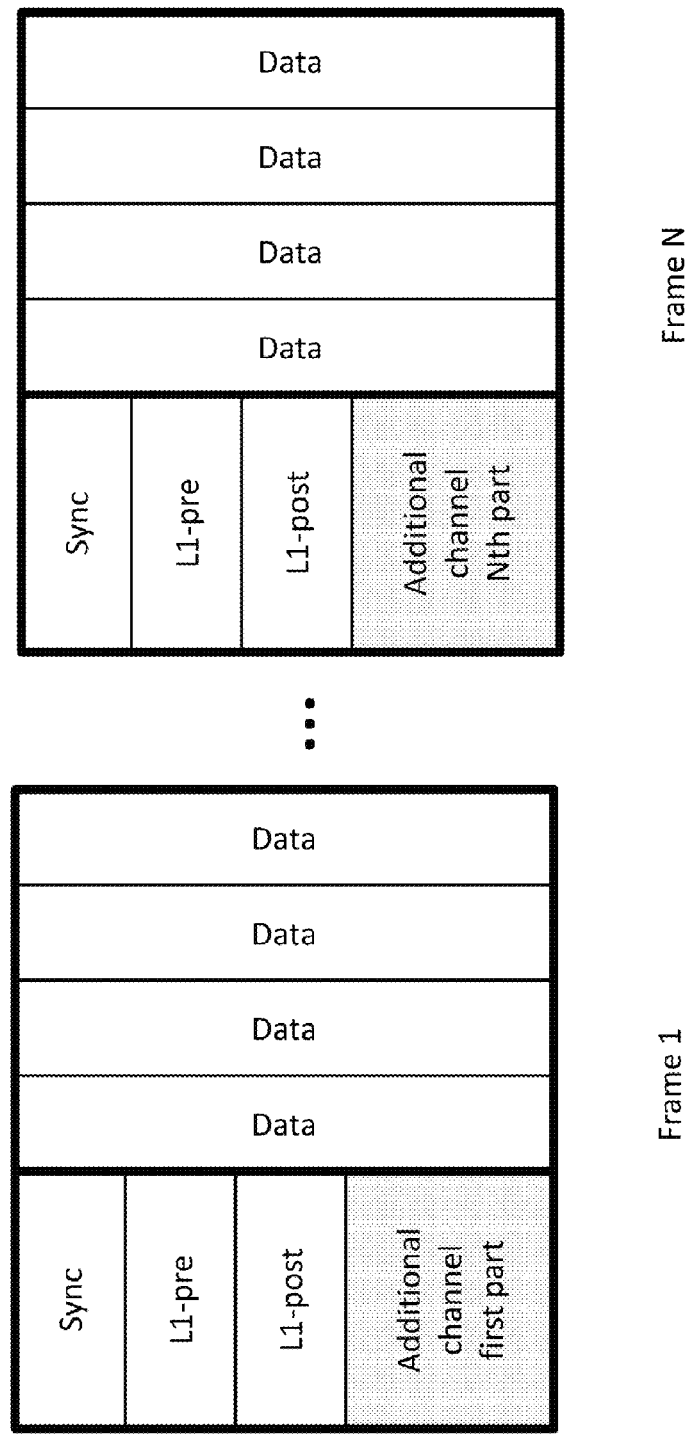

In the example illustrated in FIG. 4, the synchronisation sequence, L1-pre signalling and L1-post signalling are mapped to the P2 symbols. Then, the information to be carried by the additional channels is divided into N parts (e.g. N=2, 3, 4, . . . ), where each part has a size no greater than the spare capacity of the P2 symbols of a single frame after mapping of the synchronisation sequence, L1-pre signalling and L1-post signalling. Each part is then mapped to the spare P2 symbols of respective different frames (e.g. successive frames), indicated in FIG. 4 by the shaded regions of the frames. A counter may be provided in the signalling part of the frame (e.g. in the L1-pre signalling) to indicate which part of the information is carried in each frame.

In this example, since the additional channels are mapped only to the P2 symbols, receivers operating in both full operational mode and P2 monitoring mode may receive the additional channels. However, since the information carried by the additional channels is spread across N frames, there will be an N-frame delay in receiving the complete information carried by the additional channels.

Figure 5:
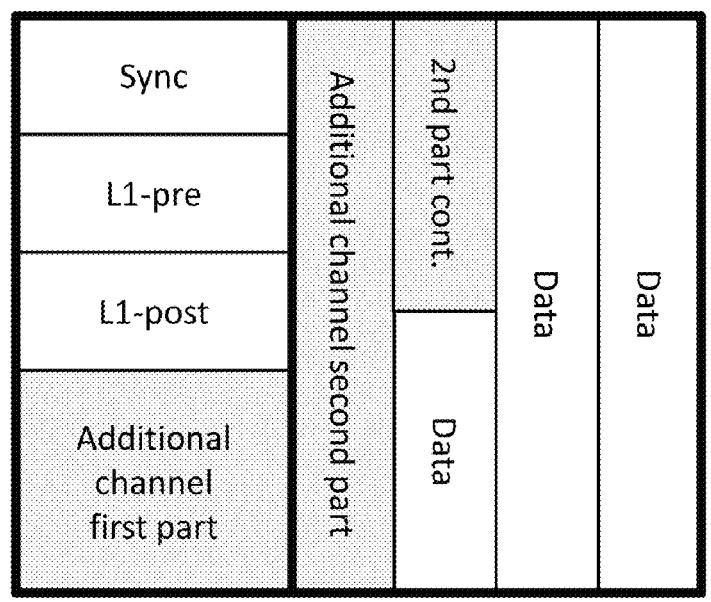

In the example illustrated in FIG. 5, the synchronisation sequence, L1-pre signalling and L1-post signalling are mapped to the P2 symbols. Then, the information to be carried by the additional channels is divided into two parts. The first part has a size no greater than the spare capacity of the P2 symbols of a single frame after mapping of the synchronisation sequence, L1-pre signalling and L1-post signalling. The second part comprises the remainder of the information. The first part is mapped to the spare P2 symbols of a certain frame and the second part is mapped to one or more data symbols of the same frame. For example, the information may be mapped to the data symbols in the form of a type-1 PLP. The length of the additional channel may be indicated in the signalling part of the frame (e.g. in the L1-pre signalling).

In this example, since the additional channels are mapped to both P2 symbols and data symbols, a receiver operating in P2 monitoring mode will be unable to receive the additional channels. However, a receiver operating in full operational mode will be able to receive the additional channels within a single frame, minimising delay.

Figure 6:
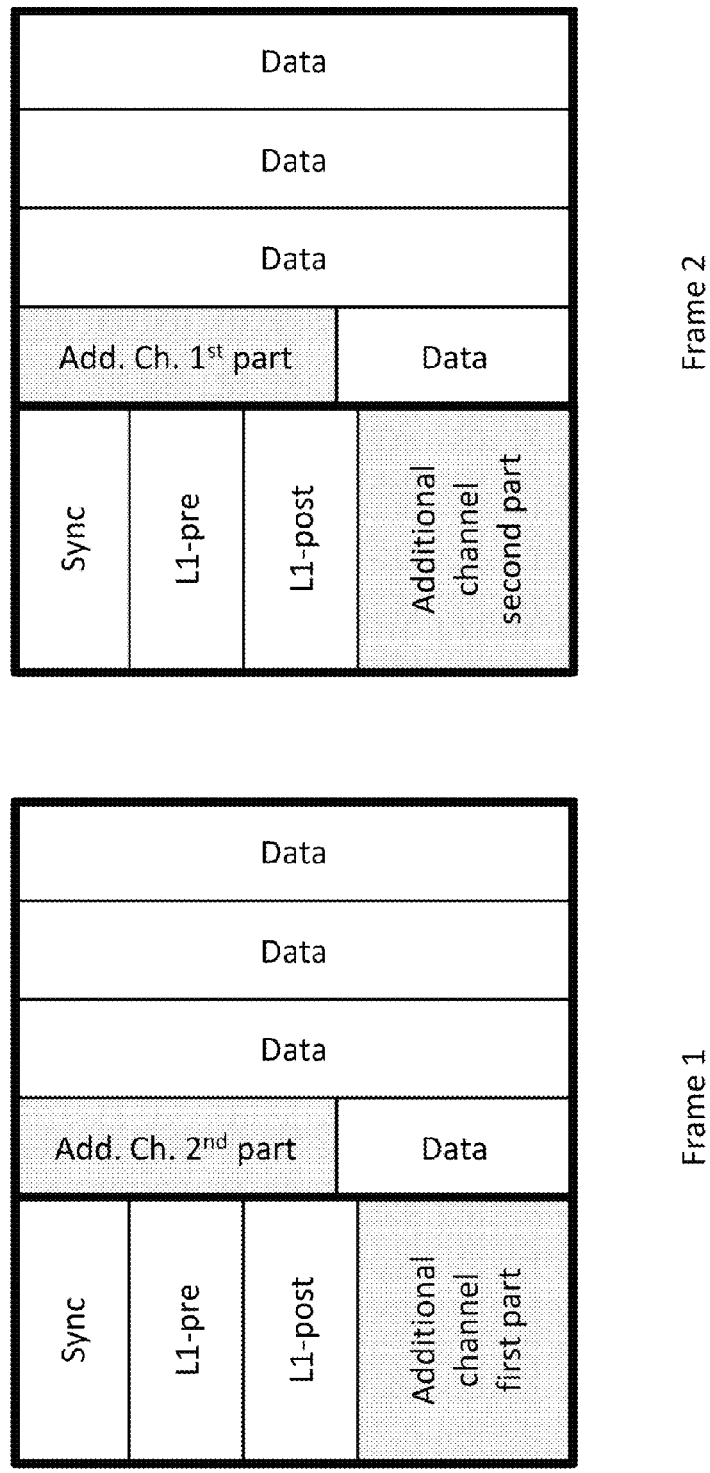

In the example illustrated in FIG. 6, the synchronisation sequence, L1-pre signalling and L1-post signalling are mapped to the P2 symbols. Then, the information to be carried by the additional channels is divided into two parts. The first and second parts each have a size no greater than the spare capacity of the P2 symbols of a single frame after mapping of the synchronisation sequence, L1-pre signalling and L1-post signalling. The first part is mapped to the spare P2 symbols of a first frame and the second part is mapped to one or more data symbols of the same frame. In addition, the second part is mapped to the spare P2 symbols of a second frame (e.g. a frame immediately following the first frame) and the first part is mapped to one or more data symbols of the same frame. The order of the parts within a frame may be indicated in the signalling part of the frame (e.g. in the L1-pre signalling).

In this example, information to be carried by the additional channels is mapped to both P2 symbols and data symbols. However, since complete information is mapped to P2 symbols of successive frames, it is possible for a receiver operating in P2 monitoring mode to receive the additional channels, although with a delay of two frames. On the other hand, since complete information is also mapped to P2 symbols and data symbols of the same frame, it is possible for a receiver operating in full operational mode to receive the additional channels within a single frame, minimising delay.

Figure 7:
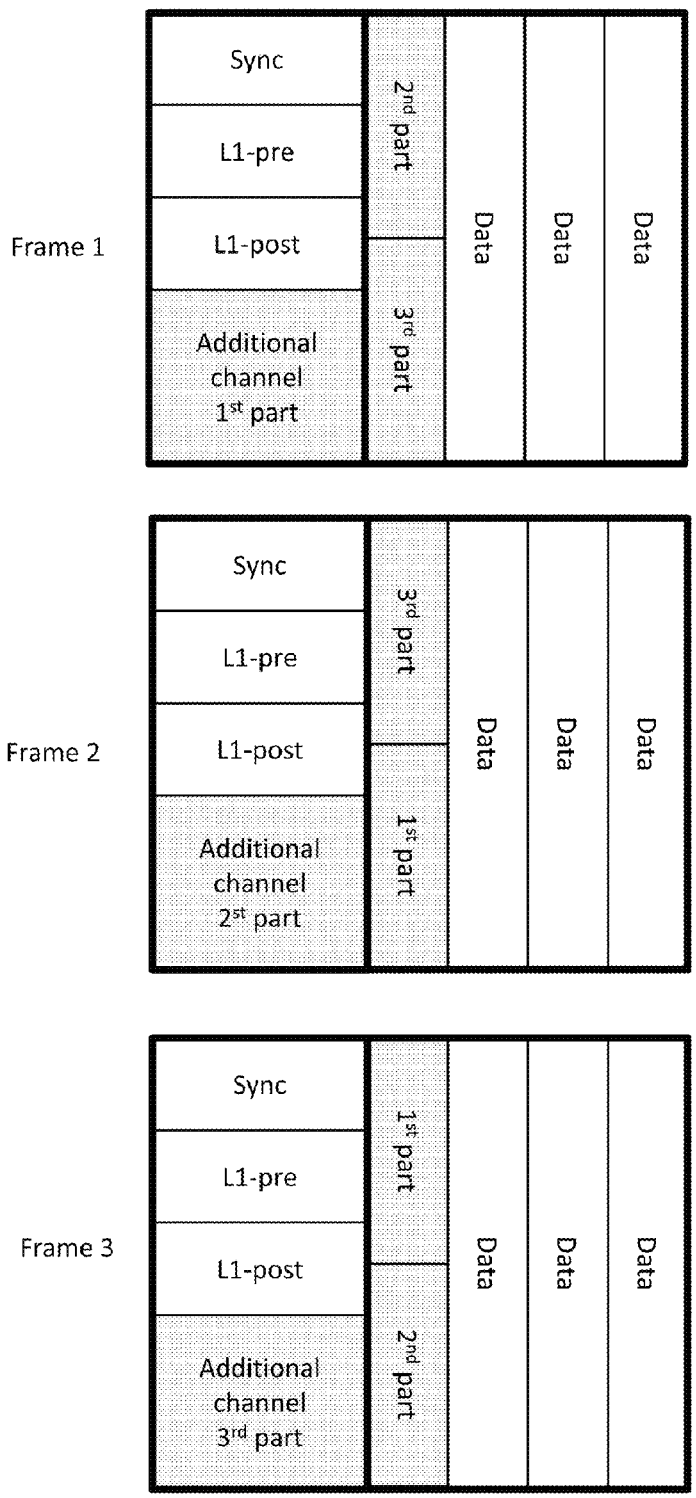

In the example illustrated in FIG. 7, the synchronisation sequence, L1-pre signalling and L1-post signalling are mapped to the P2 symbols. Then, the information to be carried by the additional channels is divided into N parts (e.g. N=2, 3, 4, . . . ). In the example illustrated in FIG. 7, N=3. The example illustrated in FIG. 6 may be regarded as a case in which N=2.

Each part has a size no greater than the spare capacity of the P2 symbols of a single frame after mapping of the synchronisation sequence, L1-pre signalling and L1-post signalling. The number of parts N may be given by N=ceil $[N_{cells}/N_{P2\_ADD\_CH}]$ where $N_{cells}$ is the total number of cells required to carry the information of the additional channels, $N_{P2\_ADD\_CH}$ is the total number of spare cells in the P2 symbols of a single frame, and ceil denotes the ceiling operator. In this case, the length of the first N-1 parts will be equal to $N_{P2\_ADD\_CH}$, while the length of the Nth part will be less than or equal to $N_{P2\_ADD\_CH}$. If the length of the Nth part is less than $N_{P2\_ADD\_CH}$, then padding may be used to increase the length to $N_{P2\_ADD\_CH}$. Alternatively, padding may be omitted, for example by indicating the length of the Nth part in the signalling part of the frame (e.g. in the L1-pre signalling).

The first to Nth parts are mapped, respectively, to the spare P2 symbols of N frames (e.g. N successive frames). For example, the kth part may be mapped to the spare P2 symbols of the kth frame. The number of the part mapped to the P2 symbols in a certain frame may be indicated in the signalling part of that frame (e.g. in the L1-pre signalling). In addition, in each frame, the parts other than the part mapped to the P2 symbols are mapped to the data symbols of the same frame. For example in the kth frame (k=1, 2, . . . , N), the parts other than the kth part may be cyclically ordered to obtain the order [k+1, k+2, . . . , N, 1, 2, . . . , k−1] and the parts other than the kth part may be mapped to the data symbols in the cyclic order.

In this example, a receiver operating in the P2 monitoring mode may receive the additional channels with an N-frame delay, while a receiver operating in the full operational mode may receive the additional channels within a single frame.

Figure 8:
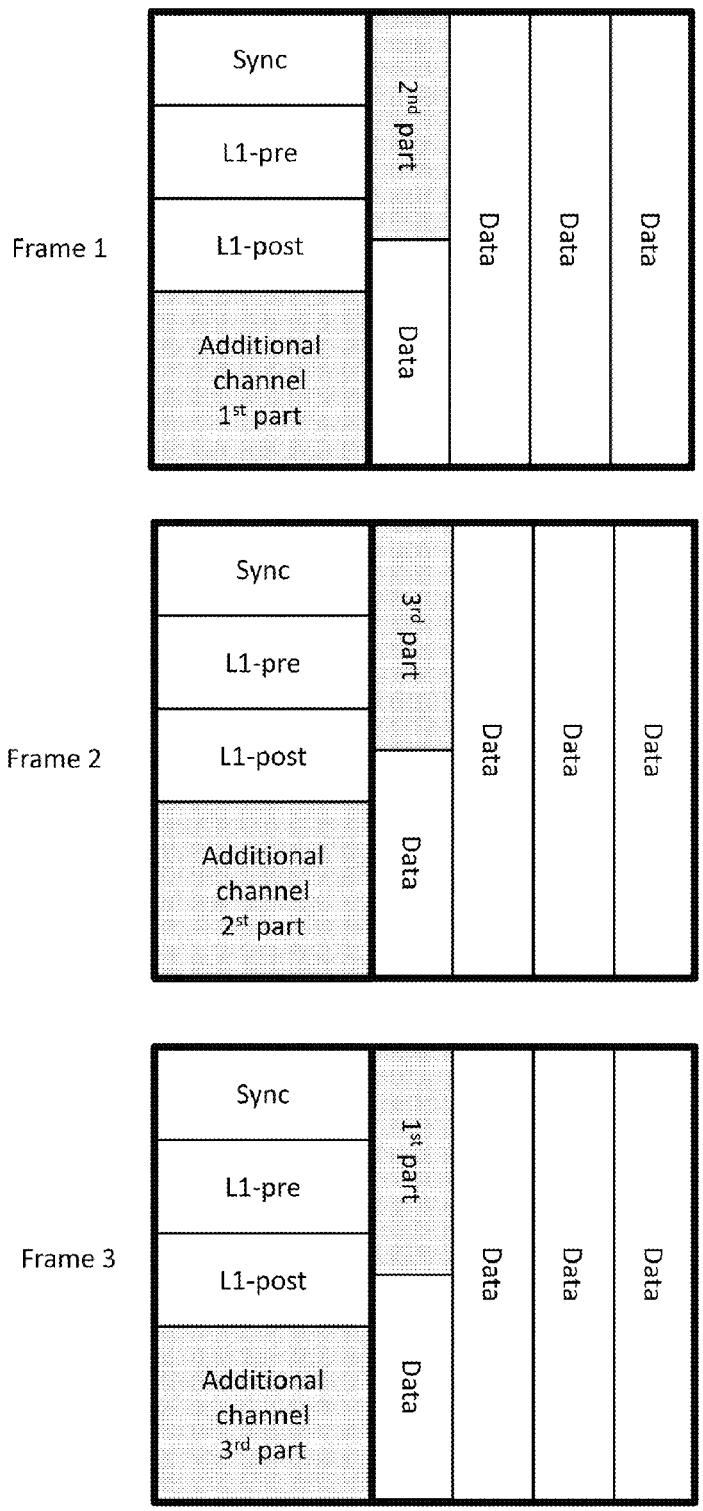

FIGS. 8 and 9 illustrate yet further examples. In these examples, the information to be carried by the additional channels is divided into N parts. In the example illustrated in FIG. 8, N=3, while in the example illustrated in FIG. 9, N=4. As with the example illustrated in FIG. 7, in the examples illustrated in FIGS. 8 and 9, a kth part (k=1, 2, . . . , N) is mapped to the spare P2 symbols of a kth frame. However, unlike the example illustrated in FIG. 7, the data symbols of the kth frame do not carry all remaining parts (that is, all parts other than the kth part), but rather carry only a subset of the remaining parts. For example, in the example illustrated in FIG. 8, one of the two remaining parts are mapped to the data symbols of the kth frame, while in the example illustrated in FIG. 9, two of the three remaining parts are mapped to the data symbols of the kth frame. However, in each of the examples illustrated in FIGS. 8 and 9, all parts occur at least once in two successive frames.

In the examples illustrated in FIGS. 8 and 9, a receiver operating in the P2 monitoring mode may receive the additional channels with a three-frame delay (in the example illustrated in FIG. 8) or a four-frame delay (in the example illustrated in FIG. 9), while a receiver operating in the full operational mode may receive the additional channels with a two-frame delay. Although the examples illustrated in FIGS. 8 and 9 incur a greater receive delay for a receiver operating in the full operational mode when compared to the example illustrated in FIG. 7, transmission redundancy is reduced in the examples illustrated in FIGS. 8 and 9 when compared to the example illustrated in FIG. 7.

In certain exemplary embodiments, information to be carried by the additional channels may be divided into N parts, which may be mapped to the P2 symbols and data symbols of frames such that: (i) the union of the parts mapped to the P2 symbols only of $N_1$ successive frames ($N_1 \leq N$) comprise each of the N parts at least once; and (ii) the union of the parts mapped to both the P2 symbols and the data symbols of $N_2$ successive frames ($N_2 < N_1$) comprise each of the N parts at least once. Under these conditions, a receiver operating in the P2 monitoring mode may receive the additional channels with an $N_1$-frame delay, while a receiver operating in the full operational mode may receive the additional channels with a (shorter) $N_2$-frame delay. The mapping may be adjusted to strike a balance between transmission redundancy and receive delay. FIGS. 6-9 illustrate various examples.

In another example, N parts may be mapped to the P2 symbols in N respective successive frames (allowing a receiver operating in the P2 monitoring mode to receive the additional channels with an N-frame delay). Also, in one of the N frames (e.g. the first frame), one of the parts (e.g. the first part) is mapped to the P2 symbols, and the remaining N-1 parts are mapped to the data symbols of the same frame (allowing a receiver operating in the full operational mode to receive the additional channels within a single frame). However, in all of the other N-1 frames, one of the parts is mapped to the P2 symbols, but no parts are mapped to the data symbols (to reduce transmission redundancy).

In some case, the additional channels may comprise a variable channel (e.g. a variable FIC). In this case, the system may be configured such that the variable channel only changes at each super frame. In this case, the mapping of information to frames may be performed according to any suitable embodiment, for example as described above in relation to FIGS. 3-10.

Figure 10:
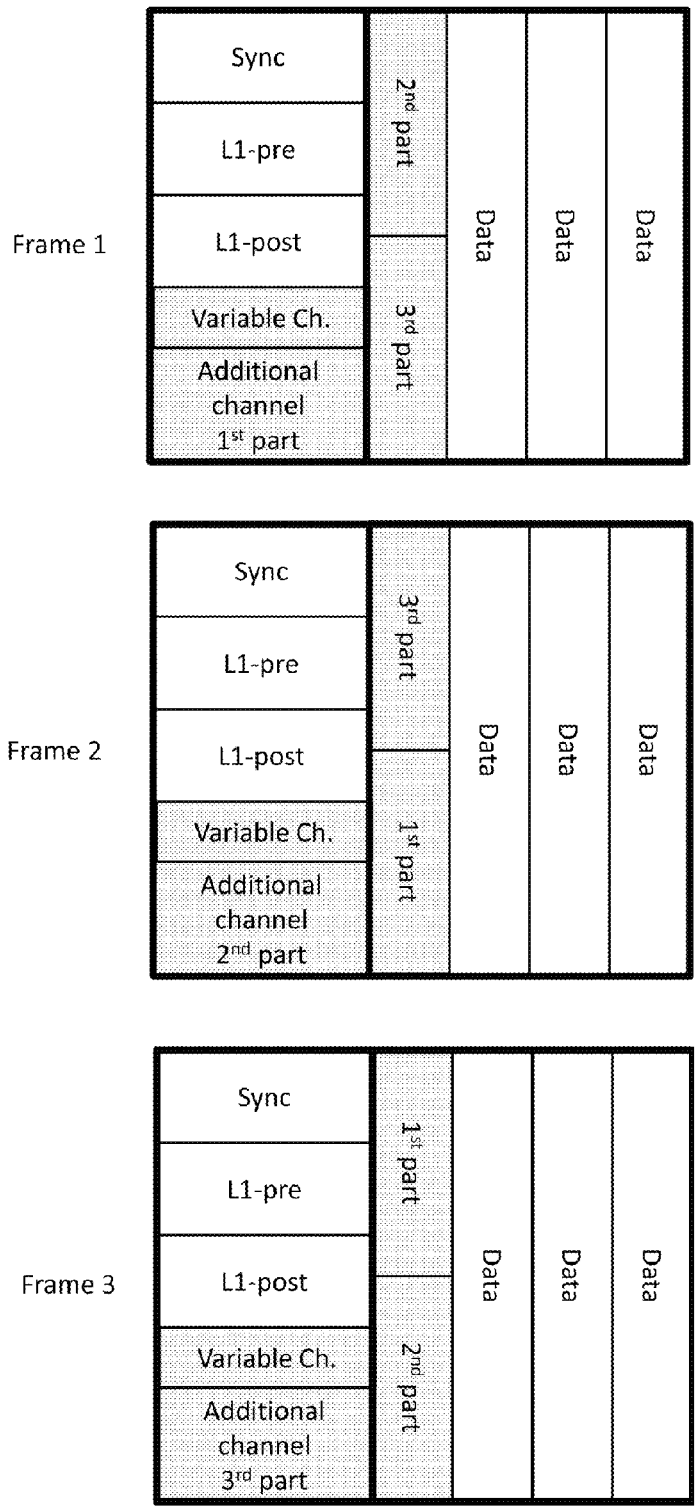

Alternatively, the additional channels may be mapped such that the variable channel is always mapped to the P2 symbols. In this case, the mapping of the other channels may be performed according to any suitable embodiment, for example as described above in relation to FIGS. 3-10. For example, as illustrated in FIG. 10, the variable channel may be mapped first in the P2 symbols before other channels are mapped to the P2 symbols and data symbols in a manner similar to the example illustrated in FIG. 7. In this way, receivers operating in both full operation mode and P2 monitoring mode may receive the variable channel.

The skilled person will appreciate that the technique described above in relation to FIG. 3 (i.e. modifying transmission parameters to increase available capacity in the preamble portion of a frame) may be applied in combination with any of the other techniques described herein, for example the techniques described in relation to FIGS. 4-10.

In the above examples, any suitable or required signalling may be provided in the frame (e.g. L1-pre signalling and/or L1-post signalling). For example, in some embodiments, the following signalling fields may be provided.

CH_ADD_ACTIVE: 1 bit field to indicate whether a FIC is present or not

CH_ADD: indicates the length, Ksig, of the additional channels

CH_ADD_MOD_POST: 1 bit field

N: number of parts into which the additional channels are divided

SLICE_LEN: indicates the length of each part of the additional channels

A field indicating which part of the additional channels is mapped to the P2 symbols in certain frame CH_ADD_MODE: indicates whether the additional channels are mapped to P2 symbols only or to both P2 symbols and data symbols A field to indicate the length of the variable part of the additional channels (e.g. a variable channel)

In some embodiments, a waking up mechanism may be provided. For example, a receiver operating in the P2 monitoring mode may be woken up (e.g. switched to the full operational mode) if a message carried by the additional channels provided in the P2 symbols is determined to be important. For example, a flag indicating the importance of the information carried by the additional channels may be provided in the signalling part of the frame.

In some embodiments, each additional channel may be treated as individual blocks for LDPC coding. However, in the case that the length of an additional channels is relatively short then the corresponding LDPC performance may be degraded. Therefore, in other embodiments, two or more additional channels (e.g. FIC+EAC+other additional channels) may be regarded as forming a single block on which LDPC coding is applied. By increasing the length of the LDPC coding blocks, more robust LDPC coding may be achieved.

In the examples described above, the part of the additional channels mapped to the P2 symbols is equal in length to the total available spare capacity in the P2 symbols. That is, the entire spare capacity of the P2 symbols is used to carry the additional channels. However, in other embodiments, not all of the available spare capacity in the P2 symbols is used to carry the additional channels. For example, the part of the additional channels mapped to the P2 symbols may be smaller than the total available capacity in the P2 symbols. The total number of parts into which the additional channels are divided may be increased, if necessary. The remaining capacity in the P2 symbols may be filled with other information or signalling, for example another channel.

Figure 11:
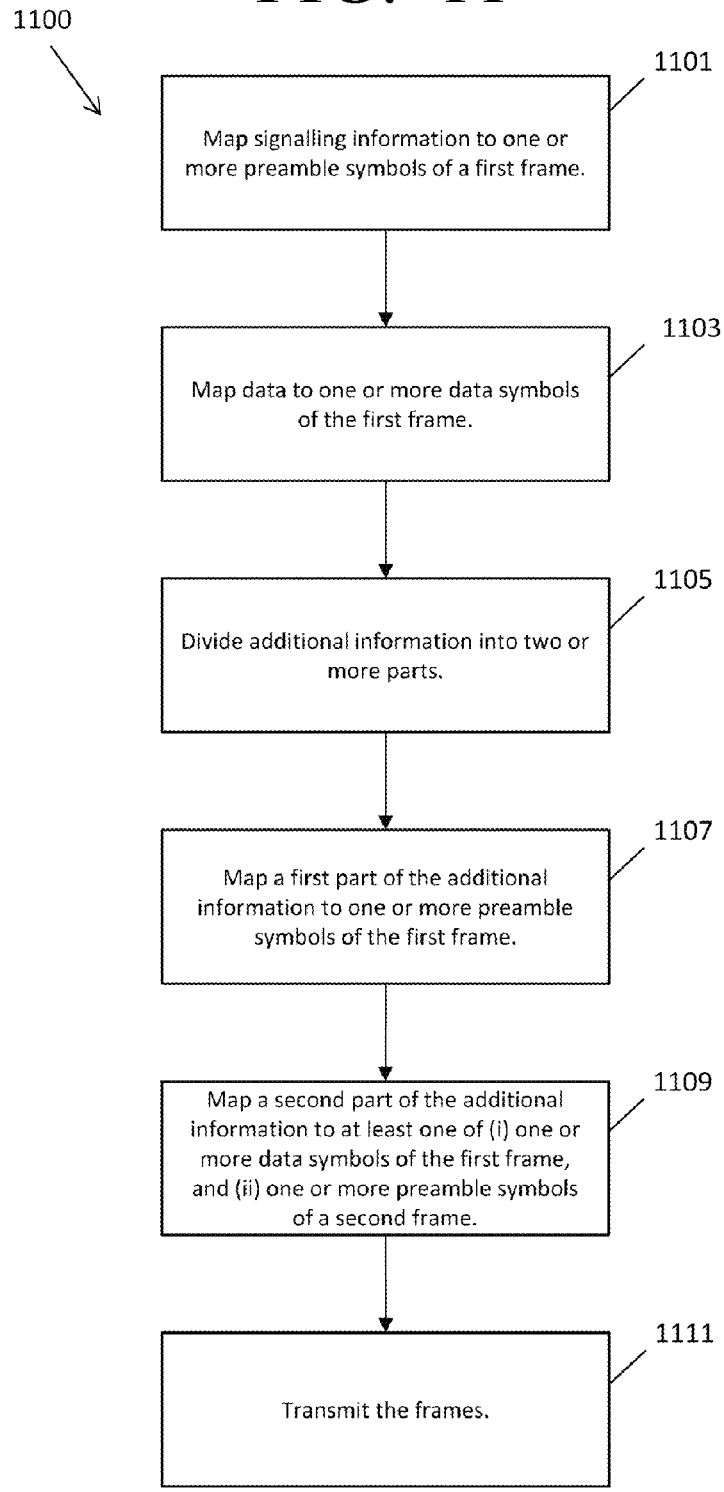
FIG. 11 illustrates an exemplary method for transmitting information.

FIG. 11 illustrates an exemplary method 1100 for transmitting information. In a first step 1101, signalling information is mapped to one or more preamble symbols of a first frame. The signalling information may comprise any suitable type of signalling, for example the signalling information described above. In a next step 1103, data is mapped to one or more data symbols of the first frame. The data may comprise any suitable type of data, for example broadcasting data in the form of PLPs. The data may be generated by, or received from, any suitable type of data-generating source. In a next step 1105, additional information is divided into two or more parts. The additional information may comprise any suitable type of information, for example one or more additional channels. In a next step 1107, a first part of the additional information is mapped to one or more preamble symbols of the first frame. In a next step 1109, a second part of the additional information is mapped to at least one of: (i) one or more data symbols of the first frame; and (ii) one or more preamble symbols of a second frame. The dividing and mapping of steps 1105, 1107 and 1109 may comprise dividing and mapping according to any of the techniques described above, for example the techniques described in relation to FIGS. 3-10. In a next step 1111, the frames are transmitted. The skilled person will appreciate that the steps of the method illustrated in FIG. 11 may be carried out in any suitable order.

Figure 12:
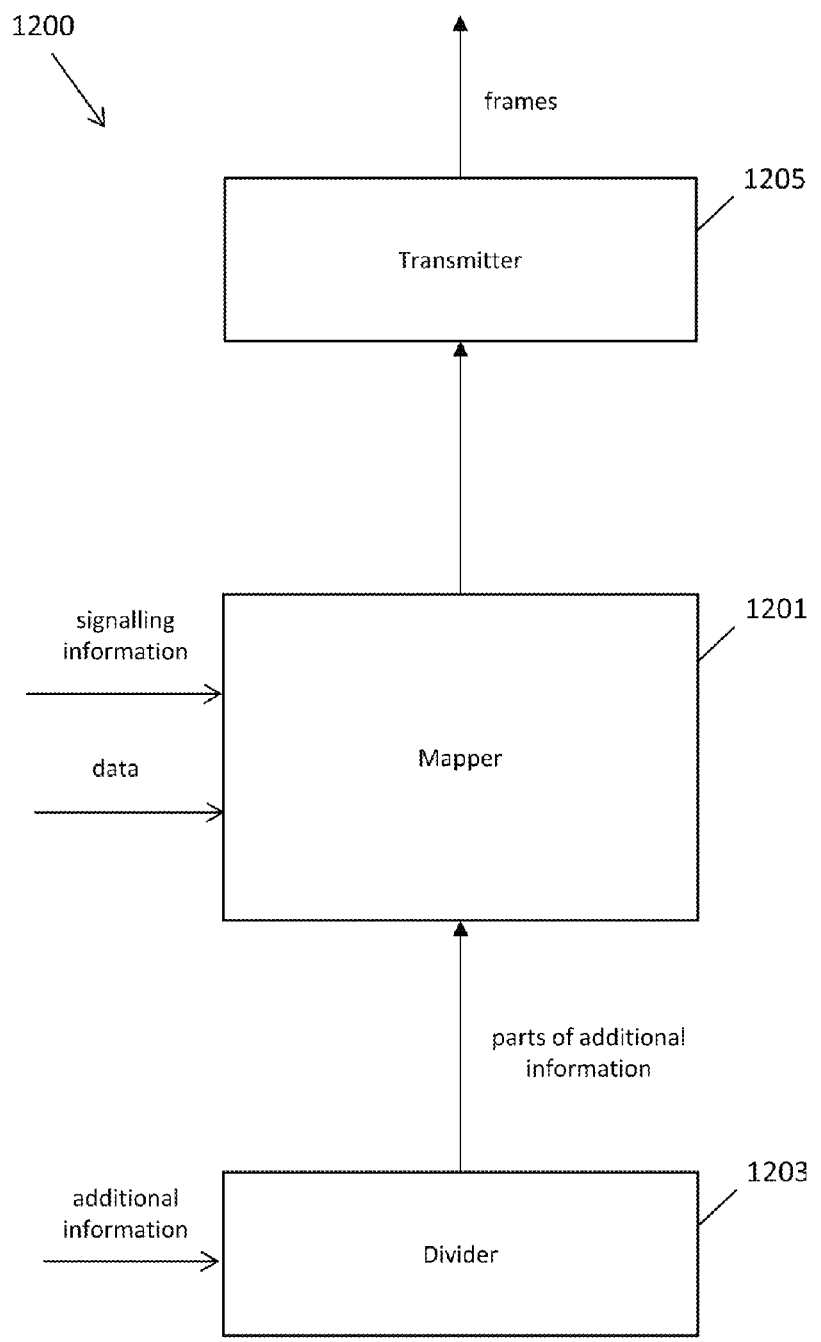
FIG. 12 illustrates an exemplary apparatus for transmitting information.

FIG. 12 illustrates an exemplary apparatus 1200 for transmitting information. The apparatus 1200 may be configured for implementing one or more of the methods described above. The apparatus 1200 comprises a mapper 1201, a divider 1203 and a transmitter 1205. The mapper 1201 is configured for receiving signalling information and data, for mapping the signalling information to one or more preamble symbols of a first frame, and for mapping the data to one or more data symbols of the first frame. The divider 1203 is configured for receiving additional information, for dividing the additional information into two or more parts, and for outputting the parts of the additional information to the mapper 1201. The mapper 1201 is further configured for mapping a first part of the additional information to one or more preamble symbols of the first frame, and for mapping a second part of the additional information to at least one of: (i) one or more data symbols of the first frame; and (ii) one or more preamble symbols of a second frame. The dividing and mapping may comprise dividing and mapping according to any of the techniques described above, for example the techniques described in relation to FIGS. 3-10. The mapper is further configured for outputting the resulting frames to the transmitter 1205. The transmitter 1205 is configured for receiving the frames from the mapper 1201, and for transmitting the frames.

The apparatus may further comprise a transmission parameter selector (not shown) for selecting one or more transmission parameters for at least one of the signalling information and the additional information such that the preamble symbols provide capacity for both the signalling information and the additional information.

A transmission side apparatus may generate and transmit information according to any of the techniques described above. A receiver side apparatus may be provided to receive the transmitted frames and for extracting the signalling, data and additional information contained therein.

Figure 13:
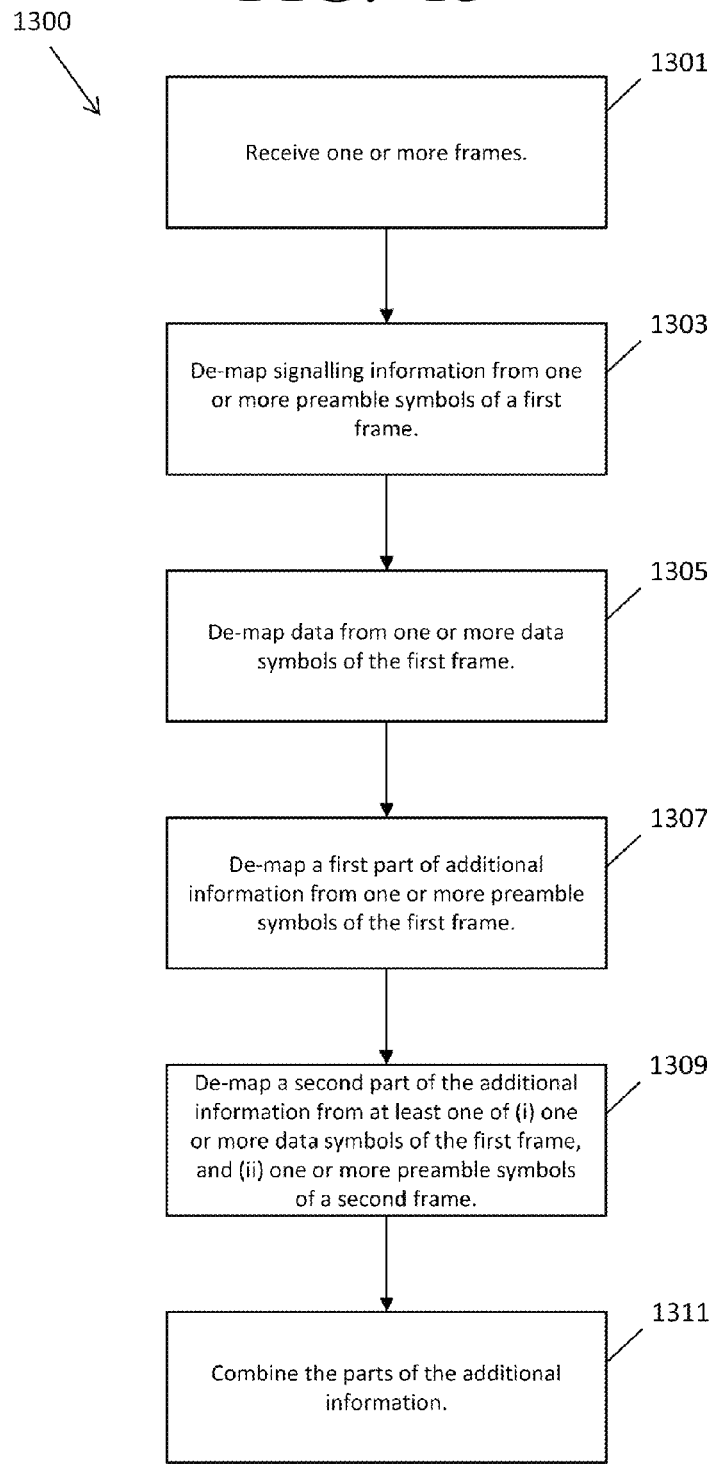
FIG. 13 illustrates an exemplary method for receiving information.

FIG. 13 illustrates an exemplary method 1300 for receiving information, corresponding to the transmission method illustrated in FIG. 11. In a first step 1301, one or more frames are received. In a next step 1303, signalling information is de-mapped from one or more preamble symbols of a first frame. In a next step 1305, data is de-mapped from one or more data symbols of the first frame. In a next step 1307, a first part of additional information is de-mapped from one or more preamble symbols of the first frame. In a next step 1309, a second part of the additional information is de-mapped from at least one of: (i) one or more data symbols of the first frame; and (ii) one or more preamble symbols of a second frame. In a next step 1311, the parts of the additional information are combined to recover the additional information. The skilled person will appreciate that the steps of the method illustrated in FIG. 13 may be carried out in any suitable order.

Figure 14:
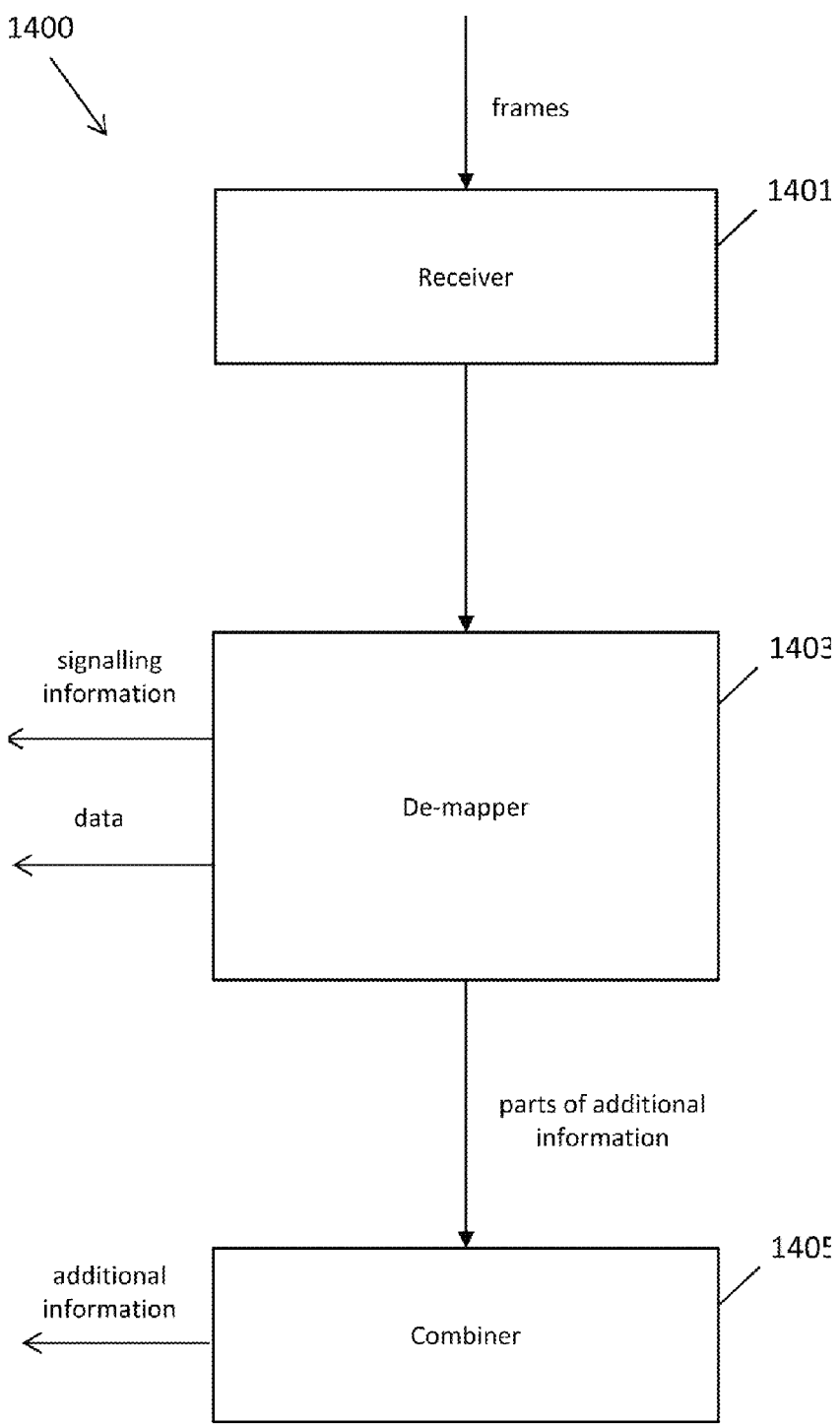
FIG. 14 illustrates an exemplary apparatus for receiving information.

FIG. 14 illustrates an exemplary apparatus 1400 for receiving information corresponding to the transmission apparatus illustrated in FIG. 12. The apparatus 1400 comprises a receiver 1401, a de-mapper 1403 and a combiner 1405. The receiver 1401 is configured for receiving one or more frames. The de-mapper 1403 is configured for de-mapping signalling information from one or more preamble symbols of a first frame, for de-mapping data from one or more data symbols of the first frame, and for outputting the signalling information and data. The de-mapper 1403 is further configured for de-mapping a first part of additional information from one or more preamble symbols of the first frame, for de-mapping a second part of the additional information from at least one of: (i) one or more data symbols of the first frame; and (ii) one or more preamble symbols of a second frame, and for outputting the parts of the additional information to the combiner 1405. The combiner 1405 is configured for combining the parts of the additional information received from the de-mapper 1403 to recover the additional information, and for outputting the additional information.

In the method illustrated in FIG. 13 or the apparatus illustrated in FIG. 14, the signalling information may be used to assist in the de-mapping, for example the de-mapping of the parts of the additional information.

Figure 15:
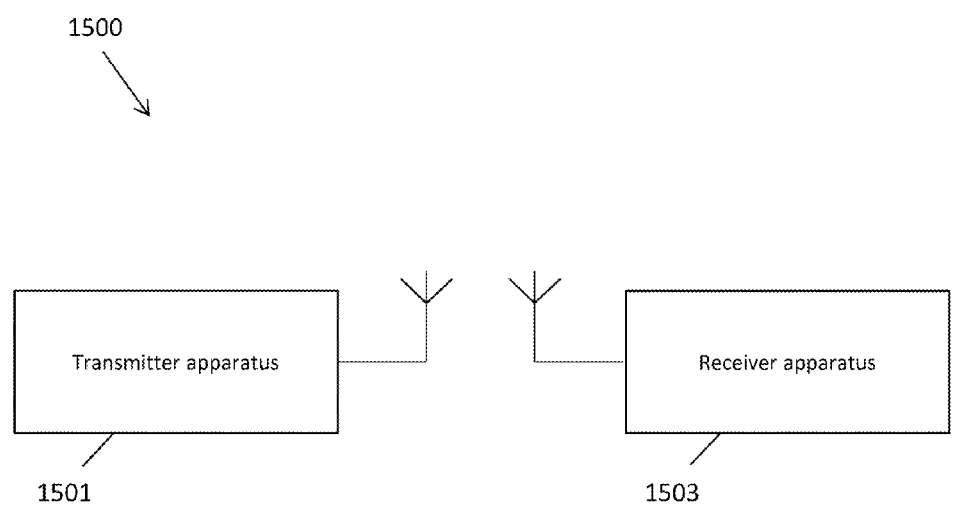
FIG. 15 illustrates an exemplary system comprising a transmitter apparatus and a receiver apparatus.

FIG. 15 illustrates an exemplary system 1500 comprising a transmitter apparatus 1501 and a receiver apparatus 1503. The transmitter apparatus 1501 may comprise an apparatus 1200 as illustrated in FIG. 12, and the receiver apparatus 1503 may comprise an apparatus 1400 as illustrated in FIG. 14.

It will be appreciated that certain embodiments of the present invention may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present invention. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the invention has been shown and described with reference to certain embodiments thereof, it will be understood by those skilled in the art that various changes in form and detail may be made therein without departing from the scope of the invention, as defined by the appended claims.

The invention claimed is:

1. A method for transmitting information, comprising the steps of:
    mapping signalling information to one or more preamble symbols of a first frame;
    mapping data to one or more data symbols of the first frame; dividing additional information into two or more parts;
    mapping a first part of the additional information to one or more preamble symbols of the first frame;

mapping a second part of the additional information to at least one of (i) one or more data symbols of the first frame, and (ii) one or more preamble symbols of a second frame; and transmitting the frames.

2. A method according to claim 1,
wherein the step of dividing the additional information comprises dividing the additional information into two parts; and
wherein the steps of mapping first and second parts of the additional information comprise mapping the first part of the additional information to one or more preamble symbols of the first frame, and mapping the second part of the additional information to one or more data symbols of the first frame.

3. A method according to claim 1,
wherein the step of dividing the additional information comprises dividing the additional information into N parts; and
wherein the steps of mapping first and second parts of the additional information comprise mapping each of the N parts of the additional information to one or more preamble symbols of N respective frames,
whereby a kth part (k=1, 2, . . . , N) of the additional information is mapped to one or more preamble symbols of a kth frame.

4. A method according to claim 3, wherein the steps of mapping first and second parts of the additional information comprise mapping one or more parts of the additional information other than the kth part to one or more data symbols of the kth frame (k=1, 2, . . . , N).

5. A method according to claim 4, wherein the steps of mapping first and second parts of the additional information comprise mapping all parts of the additional information other than the kth part to one or more data symbols of the kth frame (k=1, 2, . . . , N).

6. A method according to claim 5, wherein the parts of the additional information mapped to one or more data symbols of the kth frame are mapped to the one or more data symbols in a cyclic order.

7. A method according to claim 1, wherein the step of mapping first and second parts of the additional information comprise mapping a variable part of the additional information to one or more preamble symbols.

8. A method according to claim 1, comprising the step of selecting one or more transmission parameters for at least one of the signalling information and the additional information such that the preamble symbols provide capacity for both the signalling information and the additional information.

9. A method according to claim 8, wherein the transmission parameters comprise at least one of puncturing rate and modulation order.

10. A method according to claim 8, wherein the transmission parameters are selected such that the transmission performance of the signalling information is greater than or equal to a first threshold.

11. A method according to claim 8, wherein the transmission parameters are selected such that the transmission performance of the additional information is greater than or equal to a second threshold.

12. A method according to claim 1, wherein the steps of mapping first and second parts of the additional information comprise mapping the additional information to unused cells of one or more preamble symbols that remain unused after the step of mapping the signalling information.

13. A method according to claim 12, wherein the steps of mapping first and second parts of the additional information comprise one or more of (i) mapping the additional information such that additional information is mapped to all unused cells, and (ii) mapping the additional information such that additional information is mapped to only some unused cells.

14. A method according to claim 1, wherein the additional information comprises one or more additional channels.

15. A method according to claim 1, wherein the preamble symbols comprise P2 symbols, and the signalling information comprises L1-pre signalling and L1-post signalling.

16. A method according to claim 1, wherein the signalling information comprises at least one of:
information indicating which part of the additional information is mapped to the preamble symbols of a frame;
information indicating which part of the additional information is mapped to the data symbols of a frame;
information indicating the length of the additional information;
information indicating the number of parts of the additional information;
information indicating the length of at least one part of the additional information;
information indicating whether or not any part of the additional information is mapped to preamble symbols of a frame;
information indicating whether or not any part of the additional information is mapped to data symbols of a frame;
information indicating the length of a variable part of the additional information; and
information indicating an importance of the additional information.

17. A method for transmitting information, comprising the steps of:
mapping signalling information to one or more preamble symbols of a first frame;
mapping additional information to one or more preamble symbols of the first frame;
mapping data to one or more data symbols of the first frame;
wherein the step of mapping signalling information and additional information comprises selecting one or more transmission parameters for at least one of the signalling information and the additional information such that the preamble symbols provide capacity for both the signalling information and the additional information.

18. An apparatus for transmitting information, the apparatus comprising a mapper, a divider and a transmitter,
wherein the mapper is configured for receiving signalling information and data, for mapping the signalling information to one or more preamble symbols of a first frame, and for mapping the data to one or more data symbols of the first frame,
wherein the divider is configured for receiving additional information, and for dividing the additional information into two or more parts,
wherein the mapper is further configured for mapping a first part of the additional information to one or more preamble symbols of the first frame, and for mapping a second part of the additional information to at least one of: (i) one or more data symbols of the first frame; and (ii) one or more preamble symbols of a second frame, and
wherein the transmitter is configured for transmitting the frames.

19. A method for receiving information, comprising the steps of: receiving one or more frames;
   de-mapping signalling information from one or more preamble symbols of a first frame;
   de-mapping data from one or more data symbols of the first frame;
   de-mapping a first part of additional information from one or more preamble symbols of the first frame;
   de-mapping a second part of the additional information from at least one of (i) one or more data symbols of the first frame, and (ii) one or more preamble symbols of a second frame; and
   combining the parts of the additional information.

20. An apparatus for receiving information, comprising:
   a receiver for receiving one or more frames;
   a de-mapper for:
   de-mapping signalling information from one or more preamble symbols of a first frame,
   de-mapping data from one or more data symbols of the first frame,
   de-mapping a first part of additional information from one or more preamble symbols of the first frame, and
   de-mapping a second part of the additional information from at least one of (i) one or more data symbols of the first frame, and (ii) one or more preamble symbols of a second frame; and
   a combiner for combining the parts of the additional information.

\* \* \* \* \*